United States Patent [19]
Ullman, Jr.

[11] 3,974,924
[45] Aug. 17, 1976

[54] BOAT TRAILER
[75] Inventor: Myron E. Ullman, Jr., Canfield, Ohio
[73] Assignee: Tee Nee Trailer Company, Youngstown, Ohio
[22] Filed: July 12, 1974
[21] Appl. No.: 487,861

[52] U.S. Cl............................. 214/84; 280/4.4 R
[51] Int. Cl.² .......................................... B60P 3/10
[58] Field of Search..................... 214/84, 505, 506; 280/414 R

[56] References Cited
UNITED STATES PATENTS
3,512,667 5/1970 Calkins ........................... 214/84 X
3,785,677 1/1974 Calkins ................................. 214/84

*Primary Examiner*—Albert J. Makay
*Attorney, Agent, or Firm*—Meyer, Tilberry & Body

[57] ABSTRACT

A boat trailer having weight distributing and stabilizing cradles fore and aft for small craft, and cradles fore, aft, and midships for medium to heavy craft. The aft cradle provides mechanical leverage to assist during winching to lift and to lower a boat hull from and into the water.

26 Claims, 13 Drawing Figures

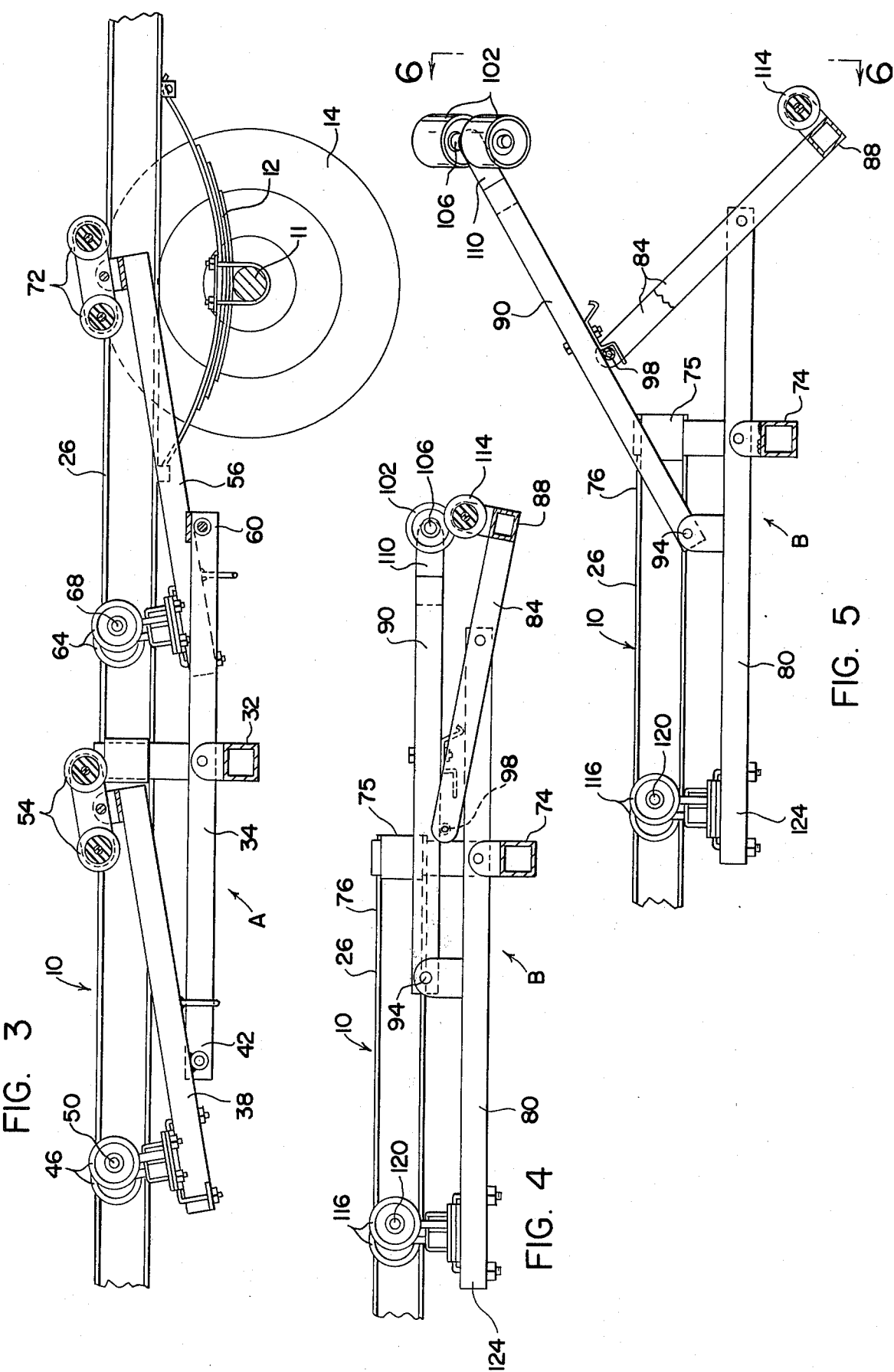

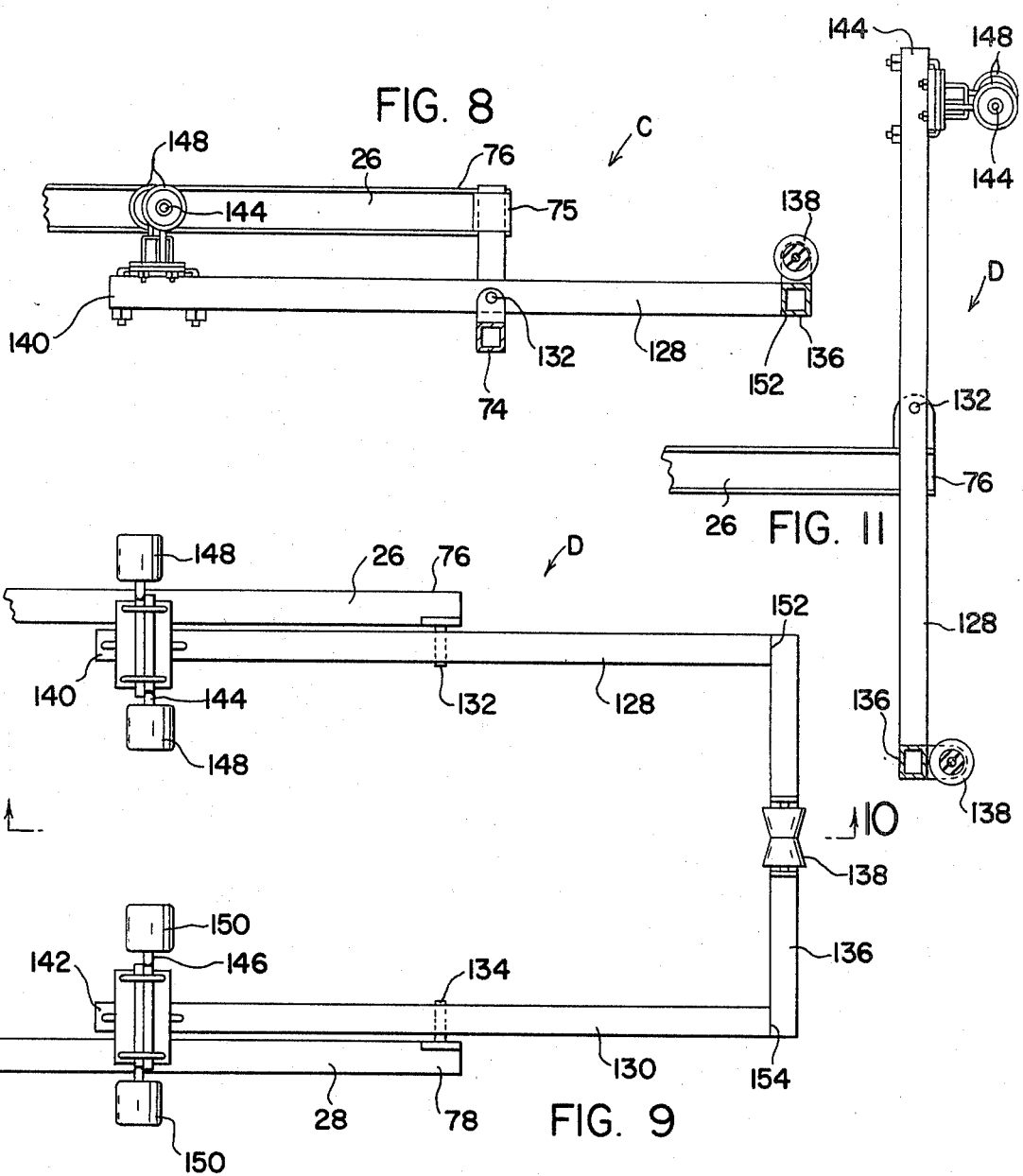
FIG. 8
FIG. 9
FIG. 11
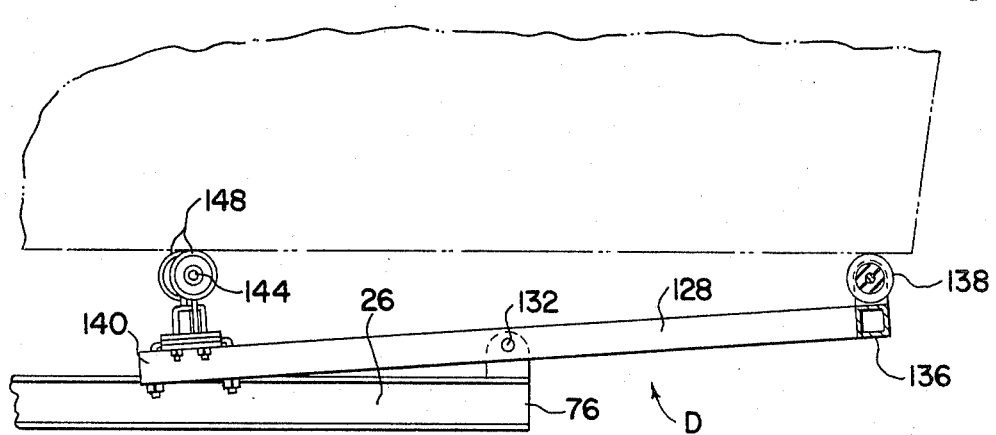
FIG. 10

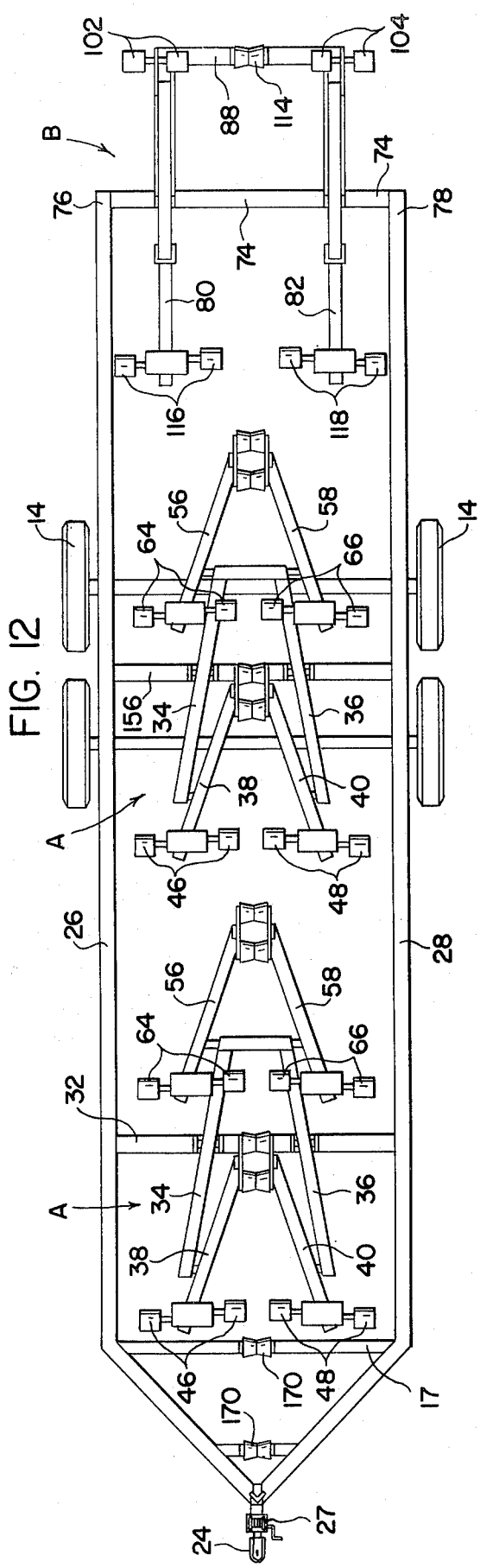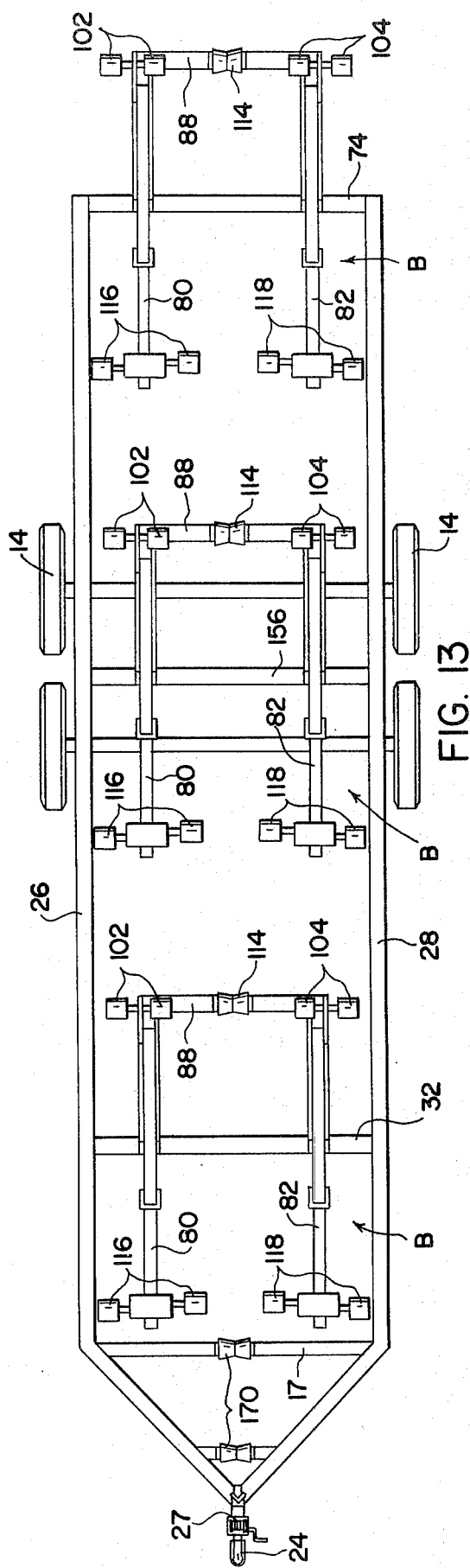

BOAT TRAILER

BACKGROUND

In launching a boat from a two wheeled trailer, or recovering the boat onto the trailer, the most difficult period of the operation is during the boat's passgae over the end members of the trailer. Various means have been heretofore attempted to facilitate the transition of a boat hull to and from a trailer such as extension tracks, derricks, cables, booms, rollers and combinations of these devices including means to tilt the entire trailer.

Boat trailers have also been built in the past using rollers fixed to the main frame and/or in combination with rollers on the main frame and on sub-frames or cradles pivoted to the main frame. The purpose of these devices has primarily been to facilitate loading and unloading operations, and although many means have been disclosed in the prior art purporting to be solutions to unloading and loading problems, these prior designs have not entirely avoided cumbersome, and/or mechanically inefficient mechanisms.

Another problem in prior designs has been adaptability of the trailer to more than one hull shape. Many designs require permanent mechanical adjustment of some of the supports on the trailer to adapt the hull for each particular boat being carried. Such adjustment involves loosening and tightening threaded fasteners which is an added servicing expense to the dealer and/or an additional cost to the owner. Some designs providing self adjusting support means can only accommodate a limited range of hull shapes.

The present invention provides a solution to previously encountered problems of cumbersome loading and unloading boat trailer hardware in terms of self adjustability, mechanical efficiency, simplicity of operation, reliability, cost of manufacture, ruggedness and ease of maintenance. The self-adjusting cradles of the present invention will adapt to receive a wide range of shapes including flat, round and V-shaped hulls.

It is therefore an object of the present invention to provide a boat trailer which is constructed to facilitate loading and unloading a boat from the trailer.

Another object of the invention is to provide a boat trailer with self-adjusting cradles which adapt to receive and support a wide range of hull shapes.

It is a further object of the invention to provide a boat trailer whose hull engaging rollers are located on self adjusting cradles adapted to equalize the weight of the boat over several support rollers when it is fully loaded onto the trailer.

It is yet a further object of the invention to provide a boat trailer having an end cradle adapted to mechanically assist in loading and unloading operations.

Other objects and advantages will become apparent from the following description taken in conjunction with the accompanying drawings in which:

FIG. 3 is a fragmentary elevational view in section of a preferred embodiment of the invention taken along the line 3—3 of FIG. 2.

FIG. 4 is a fragmentary rear elevational view of a preferred embodiment of the invention taken along the line 4—4 of FIG. 2.

FIG. 5 is a fragmentary sectional view of a preferred embodiment of the invention similar to FIG. 4 showing the rear cradle is an elevated position.

FIG. 8 is a fragmentary elevation in section of a preferred embodiment of the invention taken along the line 8—8 of FIG. 7.

FIG. 9 is a fragmentary plan view in section of still another preferred embodiment of the invention.

FIG. 10 is a fragmentary elevational view of the preferred embodiment of the invention of FIG. 9.

FIG. 11 is a fragmentary elevational side view of the embodiment of the invention shown in FIG. 10, shown in a lowered position.

FIG. 12 is a plan view of still another embodiment of the invention similar to the embodiment of FIG. 2, but with an intermediate cradle of the type shown on the forward portion of the trailer of FIG. 2, and FIG. 13 is a plan view of still yet another embodiment of the invention in which cradles similar to the rear cradle of FIG. 2 are mounted on a boat trailer fore, aft and midship.

Figure 1:
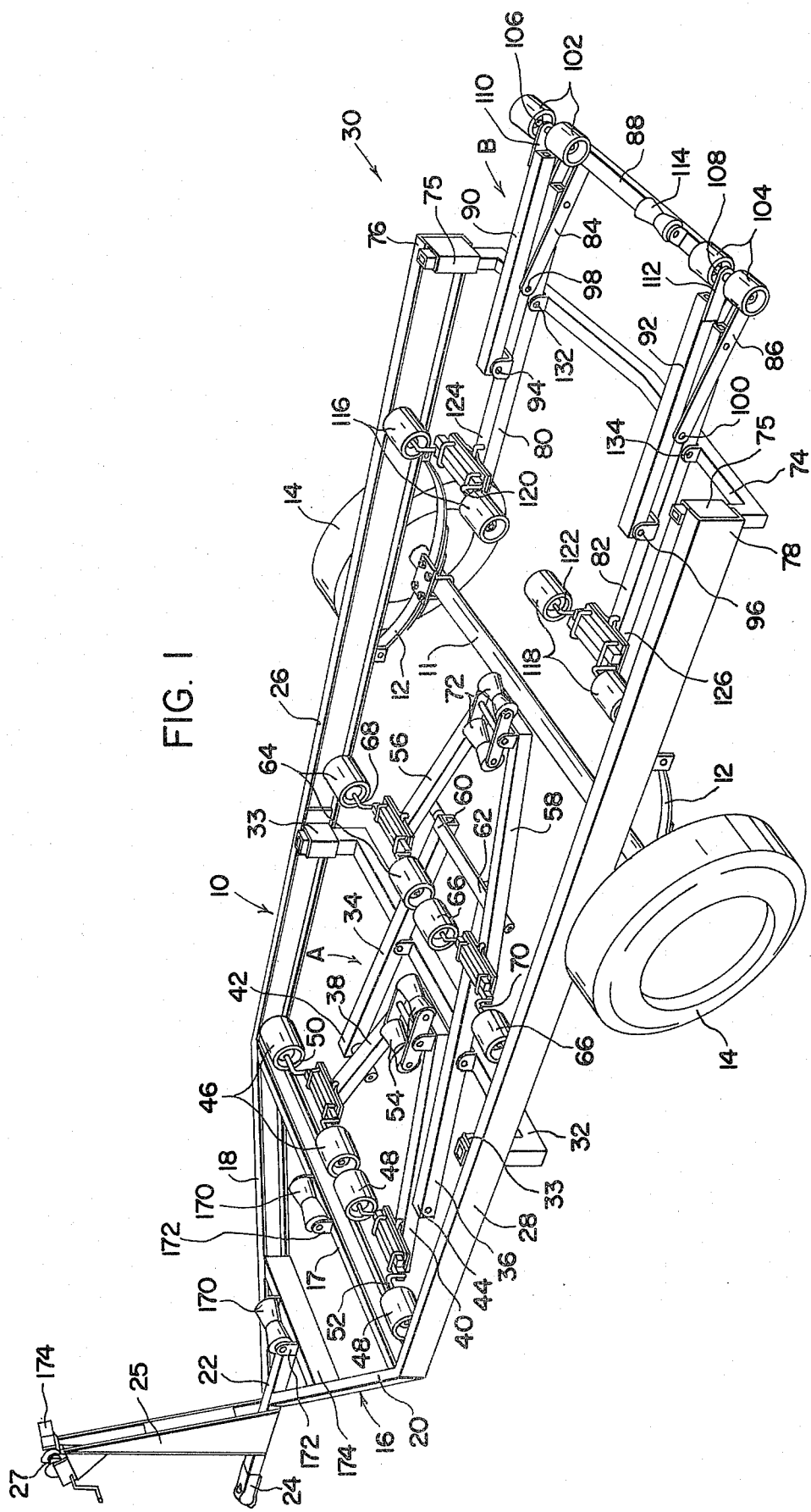
FIG. 1 is a perspective view of a preferred embodiment of the invention.
Figure 2:
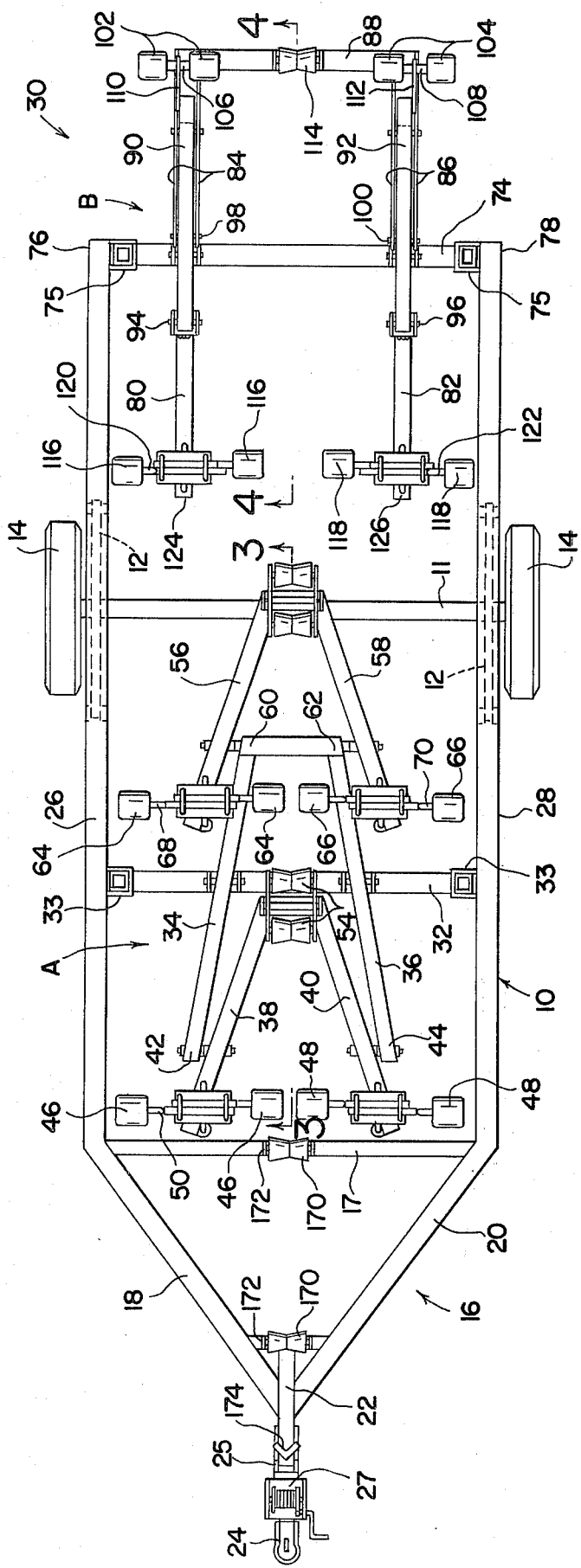
FIG. 2 is a top plan view of the preferred embodiment of the invention shown in FIG. 1.
Figure 6:
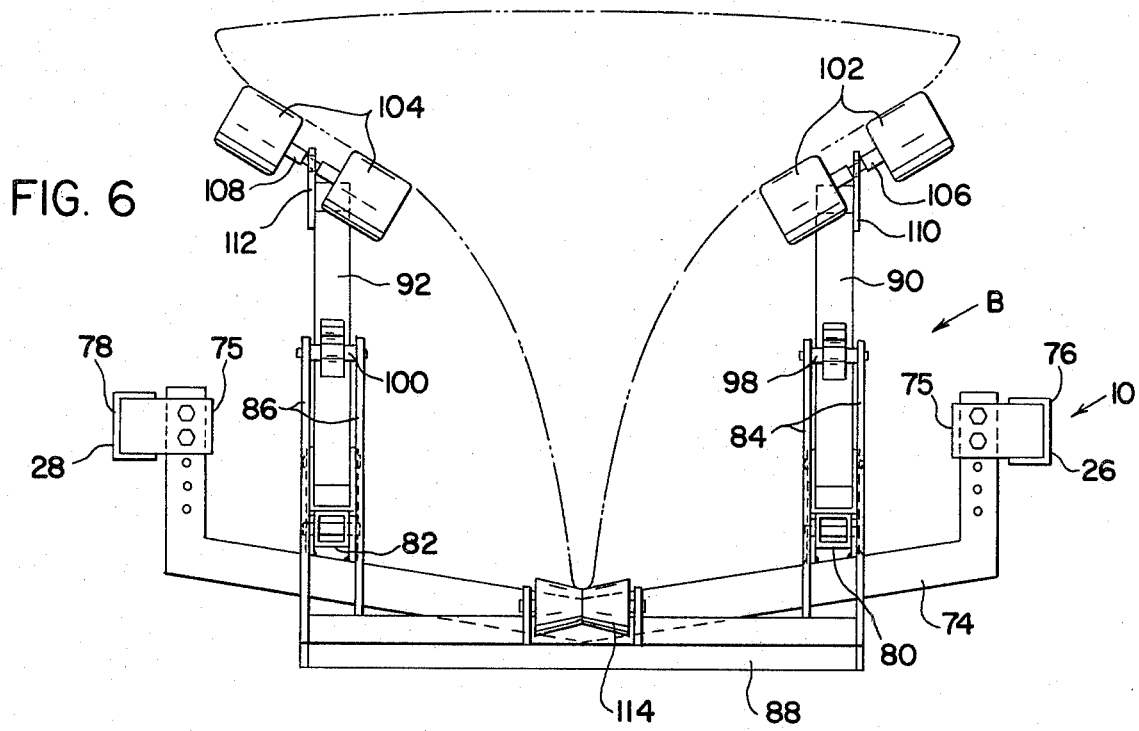
FIG. 6 is a fragmentary end in elevation view of the preferred embodiment of the invention shown in FIG. 5.

Referring now to the drawings in greater detail, FIGS. 1 and 2 show a two wheeled boat trailer having a main frame 10 mounted on axle 11 and suspension means 12 to carry a pair of wheels 14. The main frame 10 includes a bow portion 16 including channel members 18 and 20 secured to a tongue 22 and having a suitable vehicle towing hitch 24 and mooring mast 25 secured thereto. A conventional winch 27 is secured to the mast 25. The main frame 10 also includes a pair of transversely spaced apart parallel side rails 26 and 28 secured to channel members 17, 18 and 20 and extending rearwardly therefrom to the unloading end 30 of the main frame. The main frame 10 carries cradles both fore and aft for receiving and distributing the weight of the boat hull thereon. The fore cradle A comprises a cross brace 32, mounted in brackets 33 for vertical adjustment, to which is secured a pair of rocker arms 34 and 36 pivotally mounted thereon. A forward A-frame, comprising members 38 and 40, is pivotally secured to the forward ends 42 and 44 of rocker arms 34 and 36. Hull engaging rollers 46 and 48, mounted on stub shafts 50 and 52, are secured to the forward ends of the A-frame members 38 and 40 for pivotal movement in a transverse vertical plane. Keel engaging rollers 54 are mounted at the apex of the forward A-frame. A rear A-frame, comprising arms 56 and 58, is pivotally secured to the rearward ends 60 and 62 of the rocker arms 34 and 36. Hull engaging rollers 64 and 66 are mounted on stub shafts 68 and 70 secured to the forward ends of arms 56 and 58 for independent pivotal movement in a transverse vertical plane aft of the vertical plane of the cross brace 32. Second keel supporting rollers 72 are mounted on the apex of the rear A-frame wherein, with the front end of a boat hull supported on the cradle just described, the weight of the keel on rollers 54 and 72 will cause the forward and rear A-frames to pivot downwardly at their apex portions and hull engaging rollers 46, 48, and 64, 66 to pivot upwardly into engagement with the forward hull portion of the boat. These rollers, being pivotally mounted as aforesaid, will conform to the contour of the hull.

A second cradle B is secured to the rear end of the main frame 10 by means of a cross brace 74, mounted in brackets 75 for vertical adjustment, adjacent the rear ends 76 and 78 of side rails 26 and 28. See also FIGS. 3 through 6. A pair of rocker arms 80 and 82 are pivotally secured to the cross brace 74 and spaced transversely apart. Pairs of lever arms 84 and 86 are pivotally secured to the rearward ends of the rocker arms 80 and 82 respectively and the rear ends of the lever arms 84 and 86 are in turn secured by a connecting member 88. Another pair of hull supporting lever arms 90 and 92 are pivotally secured to rocker arms 80 and 82 respectively forward of the cross brace 74 with the free ends of the arms 90 and 92 extending rearwardly from the pivotal connections 94 and 96. The free ends of the lever arms 84 and 86 are provided with means 98 and 100 to engage and lift the hull supporting lever arms 90 and 92, and such means may comprise anti-friction rollers or the like. Hull engaging rollers 102 and 104 are mounted on stub shafts 106 and 108 secured to the free ends 110 and 112 of hull engaging lever arms 90 and 92 respectively. The stub shafts 106 and 108 are adapted to pivot freely in a transverse vertical plane in the same manner as rollers 46, 48, 64, and 66 described with respect to the forward cradle A. A keel engaging roller 114 is secured to the connecting member 88.

With cradle B as thus described, it will become apparent that upon contact of the roller 114 by the keel of a boat hull, first lever arms 84 and 86 will be pivoted to force keel engaging roller 114 downwardly and the free ends of lever arms 84 and 86 upwardly, which in turn rotates second hull engaging lever arms 90 and 92 upwardly about their pivotal axes 94 and 96 to bring rollers 102 and 104 into hull engaging and supporting contact with a boat hull. Stub shafts 106 and 108 being pivotally mounted on the free ends 110 and 112 of hull engaging arms 90 and 92 respectively, rollers 102 and 104 will conform to the contour of the hull. Finally, hull engaging rollers 116 and 118 are also mounted on stub shafts 120 and 122 on the free forward ends 124 and 126 of rocker arms 80 and 82 to also support the boat hull in the same manner as the already described hull engaging rollers on cradles A and B. It will also be evident that the coaction of lever arms 84 and 86 with hull engaging lever arms 90 and 92 will assist in lifting, supporting, and distributing the weight of a boat hull between rollers 102–104, 114 and 116–118, during loading and unloading of a boat brom the rear end of the trailer. When a boat is fully loaded on the trailer, the weight of the boat will be distributed between the front and rear cradles A and B, and each cradle will also assist in further intra-structure weight distribution. It will be observed that in view of the freedom of movment of the stub shafts, and the hull engaging rollers mounted thereon, the rollers will automatically conform to the contour of the hull without the need of any manual adjustment of parts such as the loosening and tightening of threaded fasteners and brackets.

Figure 7:
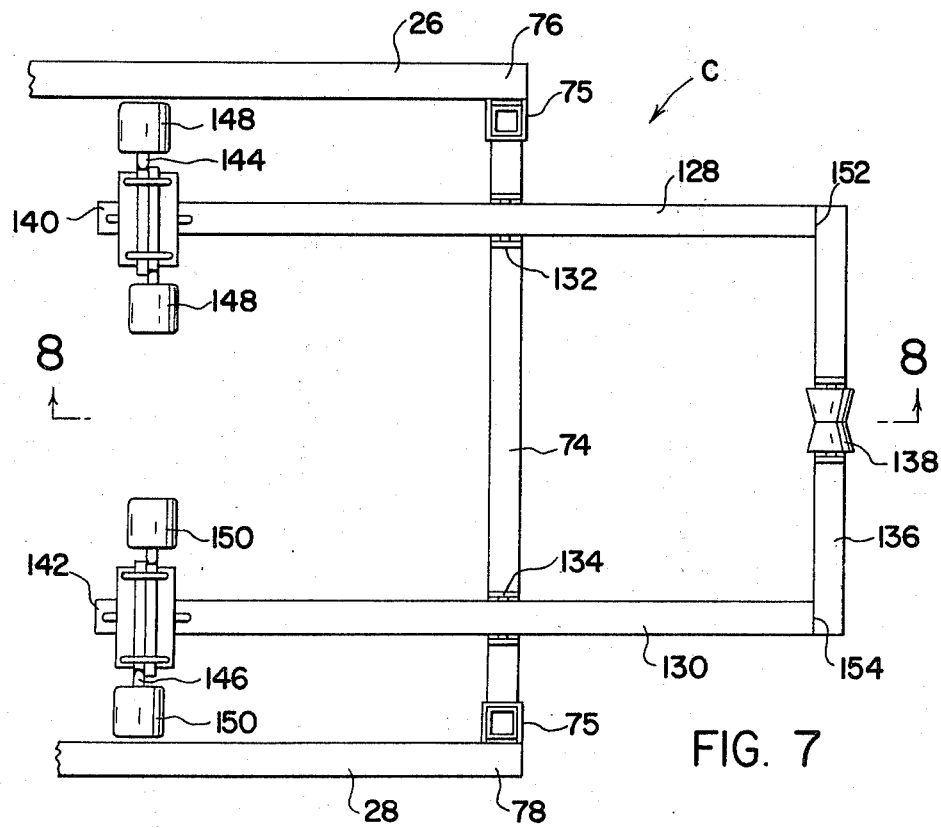
FIG. 7 is a fragmentary plan view of yet another preferred embodiment of the invention.

Another preferred embodiment of a rear cradle C is shown in FIGS. 7 and 8, comprising a pair of lever arms 128 and 130 pivotally secured at 132 and 134 to cross brace 74, and with connecting means 136 securing the rear ends of lever arms 128 and 130 to support a keel engaging roller 138 thereon. The forward ends 140 and 142 of lever arms 128 and 130 support stub shafts 144 and 146 which are adapted to pivot freely in a transverse vertical plane so that rollers 148 and 150 mounted thereon are permitted to conform to the contour of a boat hull supported by cradle C. Although lever arms 128 and 130 are shown mounted parallel to each other, it is also within the concept of this invention that the arms be inclined toward each other to form an A-frame, wherein connecting member 136, rather than being a cross brace, as shown in FIGS. 7 and 8, would secure the rear ends 152 and 154 of lever arms 128 and 130 to form an apex. Thus lever arms 128 and 130 would comprise an A-frame similar to the A-frames shown in FIG. 2 with respect to the forward cradle A. The cradle described and shown in FIG. 7 is balanced so that in its normal position of rest the lever arms 128 and 130 will extend rearwardly for rotation in a clockwise manner as best shown in FIG. 8, upon contact between keel engaging roller 138 and the keel of a boat. At the same time, rollers 148 and 150 will be rotated upwardly into hull engaging and supporting contact with the hull of the boat.

Yet another preferred embodiment of the rear end cradle is shown in FIGS. 9 through 11, wherein a cradle D comprises lever arms 128 and 130 pivotally secured to boat trailer side rails 26 and 28, instead of to a member such as cross brace 74 of FIG. 7. Otherwise, the structure of the embodiment of FIGS. 9 through 11 is similar to the embodiment shown in FIGS. 7 and 8, and like parts are identified by like numerals. However, in the case of the embodiment shown in FIGS. 9 through 11, the normal position of rest of the cradle is in a substantially vertical plane, as is best shown in FIG. 11. Thus it will be observed that lever arms 128 and 130 do not extend rearwardly beyond the rear ends 76 and 78 of the side rails 26 and 28. Upon engagement of the keel roller 138 with a boat keel, keel roller 138 will be initially rotated along with hull engaging rollers 148 and 150 until the hull is stabilized on the cradle D, as shown in FIG. 10. FIG. 10 is also illustrative of the fact that a flat bottom boat E can be carried as easily on this type of cradle as a hull having a round or V bottom configuration.

For larger craft requiring additional support midships, a third cradle may be provided which is supported on an intermediate cross brace 156, as shown in FIG. 12. The intermediate cradle may be either the double A-frame type A, such a shown in FIG. 12, or the double lever type B such as shown in FIG. 13. In fact several combinations of cradles types A, B, C, and D may be mounted on cross braces 32, 74 and 156 within the contemplation of this invention. For instance, illustrative of this concept, FIG. 13 shows a boat trailer for large craft wherein all three cradles are of the B type. Furthermore, all other combinations of forward and intermediate cradles of the A and B type are within the contemplation of the invention, and the rear end cradle may be of the A, B, C, or D type. Thus, it is within the contemplation of this invention that the forward, intermediate and rear cradles may be in any combination of types A and B, or any combination of types A and B in the forward and midship positions of the cradle and any types A, B, C, or D on the rear of the cradle.

From the foregoing description of the various preferred embodiments of this invention, it will be understood that as the boat is drawn onto the trailer the weight of the hull is being continuously distributed and adjusted between the keel and hull supporting rollers of first the rear cradle, and then the intermediate cradle, if one is provided, and finally the forward cradle. When the hull is finally at rest, fully drawn upon the trailer, its weight is proportionately distributed between all of the hull engaging rollers and all of the keel engaging rollers. These rollers adjustably yield to the downward pressure of the boat hull, thereby providing an even balanced support of the entire hull upon the trailer cradles.

A keel support roller 170 may be rotatably mounted between a pair of upstanding brackets 172 which in turn may be secured to the tongue 22 of the trailer, or a suitable cross brace such as cross brace 17, or cross brace 174, as best shown in FIGS. 1 and 2. If the configuration of the keel permits, two or more keel support rollers may be mounted on the trailer forward of cradle A. The keel support rollers 170 provide elevational support for the boat, as required, to supplement the elevational support provided by the cradles A, B, C, and/or D. Bow crotch 174 secured to mast 25 also provides elevational support at the bow end of the boat.

As the boat is being lowered from the trailer, the weight distribution and supporting relationship of the cradles and their rollers to the hull continues during the entire rearward movement of the hull on the supporting rollers until the hull is finally and fully launched from the trailer.

The invention has thus been described with reference to the preferred embodiments, and obvious modifications and alterations. Other modifications and alterations will occur to those skilled in the art upon the reading and understanding of this specification. It is intended that all such modifications and alterations are included insofar as they come within the scope of the appended claims.

Having thus defined my invention I claim:

1. In a boat trailer for towing a boat behind a towing vehicle and for launching and landing said boat onto and from a body of water respectively, said trailer including a wheel supported main frame having a pair of side rails; means to secure the forward end of said main frame to said towing vehicle; and in means to cradle and to load and unload a boat from the rear end of said trailer, the improvement in cradle means comprising:
   a. a cross brace secured to the rear ends of said side rails;
   b. extension means secured to and extending fore and aft of said cross brace;
   c. a pair of lever arms fulcrumed on the rear end of said extension means;
   d. connecting means secured to the rear ends of said lever arms;
   e. a pair of hull supporting arms pivotally connected to said extension means forward of said lever arms and with the free ends of said hull supporting arms positioned aft of their pivotal connections;
   f. lift means on the free ends of said lever arms to liftingly engage said hull supporting arms;
   g. keel supporting means on said connecting means adapted to receive the keel of a boat thereon; and
   h. hull supporting means on the free ends of said hull supporting arms to engage opposite sides of a boat hull, whereby the weight of the portion of a boat carried by said cradle is proportionately distributed between the said load bearing keel and hull supporting means.

2. The boat trailer defined in claim 1 wherein said extension means comprise rocker arms pivotally secured to and extending both fore and aft of said cross brace.

3. The boat trailer defined in claim 1, wherein said keel and hull supporting means are anti-frictional devices.

4. The boat trailer defined in claim 1 wherein said keel and hull supporting means are skid devices.

5. The boat trailer defined in claim 1, wherein said keel and hull supporting means are rollers.

6. The boat trailer defined in claim 1 wherein said lift means on the free ends of said lever arms are anti-friction devices.

7. The boat trailer defined in claim 6 wherein said anti-friction devices are skid means.

8. The boat trailer defined in claim 6 wherein said anti-friction devices are rollers.

9. In a boat trailer for towing a boat behind a towing vehicle and for launching and loading said boat onto and from a body of water respectively, said trailer including a wheel supported main frame having a pair of side rails; means to secure the forward end of said main frame to said towing vehicle; and in means to cradle and to load and unload a boat from the rear end of said trailer, the improvement in cradle means comprising:
   a. a pair of lever arms fulcrumed on the rear of said main frame;
   b. a pair of hull supporting arms pivotally secured to said main frame forward of said fulcra and with the free ends of said arms rearward of their pivotal axes;
   c. connecting means secured to the rear ends of said lever arms;
   d. keel receiving means secured to said connecting means; and
   e. means on the forward ends of said lever arms to make lifting engagement with said hull supporting arms when said keel receiving means is engaged with the keel of a boat.

10. The boat trailer defined in claim 1 further including:
   i. a second cross brace secured to said side rails forward of said first cross brace;
   j. rocker arm means pivotally secured to said cross brace;
   k. an A-frame pivotally secured to the rear end of said rocker arm means with the apex of said A-frame directly rearwardly;
   l. an A-frame pivotally secured to the front end of said rocker arm means with the apex of said A-frame directly rearwardly; and
   m. keel receiving means secured to the apices of said A-frames, and hull engaging means secured to the free ends of the legs of said A-frames;
   whereby the weight of the portion of the boat carried by said A-frames is proportionately distributed therebetween.

11. The boat trailer defined in claim 10, wherein said cross brace is forward of the center of balance of said trailer.

12. The boat trailer defined in claim 10, wherein said cross brace is forward of the center of balance of said trailer.

13. The boat trailer defined in claim 10, wherein said cross brace is amidships of said main frame.

14. In a boat trailer for towing a boat behind a towing vehicle and for launching and loading said boat onto and from a body of water respectively, said trailer including a wheel supported main frame having a pair of side rails; means to secure the forward end of said main frame to said towing vehicle; and in means to cradle and to load and unload a boat from the rear end of said trailer the improvement in cradle means comprising:
a. a cross brace secured to said side rails of said trailer;
b. rocker arm means pivotally secured to said cross brace to extend both fore and aft thereof;
c. a pair of lever arms fulcrumed on the rear end of said rocker arm means;
d. connecting means secured to the rear ends of said lever arms;
e. a pair of hull supporting arms pivotally connected to said rocker arm means forward of said lever arms and with the free ends of said hull supporting arms positioned aft of their pivotal connections;
f. lift means on the free ends of said lever arms to liftingly engage said hull supporting arms;
g. keel supporting means on said lever arm connecting means adapted to receive the keel of a boat thereon;
h. hull supporting means on the free ends of said hull supporting arms to engage the opposite sides of a boat hull; and
i. keel supporting means on the forward end of said rocker arm means;
whereby the weight of the portion of a boat carried by said cradle is proportionately distributed between the said load bearing keel and hull supporting means.

15. The cradle means defined in claim 14, wherein said cross brace means if forward of the center of balance of said main frame.

16. The cradle means defined in claim 14, wherein said cross brace means is rearward of the center of balance of said main frame.

17. The cradle means defined in claim 14, wherein said cross brace means is midships of said main frame.

18. The cradle means defined in claim 14, wherein said cradle means are positioned for, aft, fore, midships of said main frame.

19. In a boat trailer for towing a boat behind a towing vehicle and for launching and landing said boat onto and from a body of water respectively, said trailer including a wheel supported main frame having a pair of side rails; means to secure the forward end of said main frame to said towing vehicle; and in means to cradle and to load and unload a boat from the rear end of said trailer, the improvement in cradle means comprising;
a. a first cross brace secured to said side rails forward of the center of balance of said trailer;
b. first rocker arm means pivotally secured to said cross brace;
c. an A-frame pivotally secured to the rear end of said first rocker arm means with the apex of said A-frame directed rearwardly;
d. an A-frame pivotally secured to the front end of said first rocker arm means with the apex of said A-frame directed rearwardly;
e. keel supporting means secured to the apices of said A-frames, and hull supporting means secured to the free ends of the legs of said A-frames;
f. a second cross brace secured to the rear ends of said side rails;
g. second rocker arm means pivotally secured to and extending fore and aft of said second cross brace;
h. a pair of lever arms fulcrumed on the rear ends of said second rocker arm means;
i. connecting means secured to the rear ends of said lever arms;
j. a pair of hull supporting arms pivotally connected to said second rocker arm means forward of said lever arms and with the free ends of said supporting arms positioned aft of their pivotal connections;
k. lift means on the free ends of said lever arms to liftingly engage said hull supporting arms;
l. keel supporting means on said lever arm connecting means adapted to receive the keel of a boat thereon; and
m. hull supporting means secured to the free ends of said hull supporting arms to engage the opposite sides of a boat hull,
whereby the weight of a boat carried by said fore and aft cradles is proportionately distributed between their respective load bearing keel and hull supporting means.

20. The boat trailer defined in claim 19, including a cradle midships of said main frame comprising:
a. a cross brace secured to said side rails;
b. rocker arm means pivotally secured to said cross brace;
c. an A-frame pivotally secured to the rear end of said rocker arm means with the apex of said A-frame directed rearwardly;
d. an A-frame pivotally secured to the front end of said first rocker arm means with the apex of said A-frame directed rearwardly; and
e. keel supporting means secured to the apices of said A-frames, and hull supporting means secured to the free ends of the legs of said A-frames.

21. In a boat trailer for towing a boat behind a towing vehicle and for launching and landing said boat onto and from a body of water respectively, said trailer including a wheel supported main frame having a pair of side rails; means to secure the forward end of said main frame to said towing vehicle; and in means to cradle and to load and unload a boat from the rear end of said trailer, the improvement in cradle means comprising:
a. a first cross brace secured to said side rails forward of the center of balance of said trailer;
b. first rocker arm means pivotally secured to said cross brace;
c. an A-frame pivotally secured to the rear ends of said first rocker arm means with the apex of said A-frame directed rearwardly;
d. an A-frame pivotally secured to the front end of said first rocker arm means with the apex of said A-frame directed rearwardly;
e. keel supporting means secured to the apices of said A-frames, and hull supporting means secured to the ends of the legs of said A-frames;
f. second rocker arm means pivotally secured to the rear ends of said side rails;
g. a pair of lever arms fulcrumed on the rear end of said second rocker arm means;
h. connecting means secured to the rear ends of said lever arms;
i. a pair of hull supporting arms pivotally connected to said second rocker arm means forward of said lever arms and with the free ends of said supporting arms positioned aft of their pivotal connections;
j. lift means on the free ends of said lever arms to liftingly engage said hull supporting arms;
k. keel supporting means on said lever arm connecting means adapted to receive the keel of a boat thereon; and l. hull supporting means secured to the free ends of said hull supporting arms to engage the opposite side of a boat hull;

whereby the weight of a boat carried by said fore and aft cradles is proportionately distributed between their respective load bearing keel and hull supporting means.

22. In a boat trailer for towing a boat behind a towing vehicle and for launching and landing said boat onto and from a body of water respectively, said trailer including a wheel supported main frame having a pair of side rails; means to secure the forward end of said main frame to said towing vehicle; and in means to cradle and to load and unload a boat from the rear end of said trailer, the improvement in cradle means comprising:
 a. a first cross brace supported by said side rails forward of the center of balance of said trailer;
 b. rocker arm means pivotally secured to said cross brace;
 c. an A-frame pivotally secured to the rear end of said first rocker arm means with the apex of said A-frame directed rearwardly;
 d. an A-frame pivotally secured to the front end of said first rocker arm means with the apex of said A-frame directed rearwardly;
 e. keel supporting means secured to the apices of said A-frames, and hull supporting means secured to the ends of the legs of said A-frames;
 f. a pair of lever arms fulcrumed on the rear end of said main frame;
 g. connecting means secured to the rear ends of said lever arms;
 h. keel supporting means secured to said lever arm connecting means; and
 i. hull supporting means secured to the free ends of said lever arms;

whereby the thrust of a boat between and against said lever arms pivots said lever arms about their fulcra to assist in guiding a boat onto said trailer and whereby the weight of a boat carried by said fore and aft cradles is proportionately distributed between their respective keel and hull supporting means.

23. The boat trailer defined in claim 22, including a cross brace secured to the rear ends of said side rails to pivotally support said pair of lever arms to extend both fore and aft of said cross brace, whereby said keel supporting means is aft of said side rails and positioned to engage the keel of a boat prior to engagement between the boat hull and said hull supporting means.

24. The boat trailer defined in claim 1 further including:
 i. a first cross brace secured to said side rails forward of the center of balance of said trailer;
 j. rocker arm means pivotally secured to said cross brace to extend both fore and aft thereof;
 k. a pair of lever arms fulcrumed on the rear end of said rocker arm means;
 l. connecting means secured to the rear ends of said lever arms;
 m. a pair of hull supporting arms pivotally connected to said rocker arm means forward of said lever arms and with the free ends of said hull supporting arms positioned aft of their pivotal connections;
 n. lift means on the free ends of said lever arms to liftingly engage said hull supporting arms;
 o. keel supporting means on said lever arm connecting means adapted to receive the keel of a boat thereon;
 p. hull supporting means on the free ends of said hull supporting arms to engage the opposite sides of a boat hull;
 q. hull supporting means on the forward end of said rocker arm means;
 r. a second cross brace secured to the rear ends of said side rails;
 s. rocker arm means pivotally secured to said cross brace to extend both fore and aft thereof;
 t. a pair of lever arms fulcrumed on the rear end of said rocker arm means;
 u. connecting means secured to the rear ends of said lever arms;
 v. a pair of hull supporting arms pivotally connected to said rocker arm means forward of said lever arms and with the free ends of said hull supporting arms positioned aft of their pivotal connections;
 w. lift means on the free ends of said lever arms to liftingly engage said hull supporting arms;
 x. keel supporting means on said lever arm connecting means adapted to receive the keel of a boat thereon;
 y. hull supporting means on the free ends of said hull supporting arms to engage the opposite sides of a boat hull;

whereby the weight of a boat carried by said fore and aft cradles is proportionately distributed between their respective load bearing keel and hull supporting means.

25. The boat trailer defined in claim 1 including a forward cradle further comprising:
 i. an intermediate cross brace secured to said side rails midships of said trailer;
 j. rocker arm means pivotally secured to said cross brace to extend both fore and aft thereof;
 k. a pair of lever arms fulcrumed on the rear end of said rocker arm means;
 l. connecting means secured to the rear ends of said lever arms;
 m. a pair of hull supporting arms pivotally connected to said rocker arm means forward to said lever arms and with the free ends of said hull supporting arms positioned aft of their pivotal connections;
 n. lift means on the free ends of said lever arms to liftingly engage said hull supporting arms;
 o. keel supporting means on said lever arm connecting means adapted to receive the keel of a boat thereon; and
 p. hull supporting means on the free ends of said hull supporting arms to engage the opposite sides of a boat hull.

26. In a boat trailer for towing a boat behind a towing vehicle and for launching and landing said boat onto and from a body of water respectively, said trailer including a wheel supported main frame having a pair of side rails; means to secure the forward end of said main frame to said towing vehicle; and in means to cradle and to load and unload a boat from the rear end of said trailer, the improvement in cradle means comprising:
 a. a pair of lever arms fulcrumed on the rear end of said main frame;
 b. connecting means secured to the rear ends of said lever arms;
 c. keel supporting means secured to said lever arm connecting means, and d. hull supporting means secured to the free ends of said lever arms, said lever arms being counter balanced to cause them to swing to rest in a substantially vertical attitude, thereby aligning said keel supporting means substantially beneath and in substantially the same vertical plane as said hull supporting means, whereby the thrust of a boat against said hull engaging means pivots said lever arms about their fulcra to receive and distribute at least a portion of the weight of said boat thereon.

* * * * *